United States Patent [19]

Grey

[11] 4,194,847
[45] Mar. 25, 1980

[54] LOCATING AND MAINTAINING A HUB MEMBER ON A SHAFT

[75] Inventor: Michael O. Grey, Ithaca, N.Y.

[73] Assignee: NCR Corporation, Dayton, Ohio

[21] Appl. No.: 901,921

[22] Filed: May 1, 1978

[51] Int. Cl.² ............... B41J 23/02; F16B 21/07; F16D 1/08
[52] U.S. Cl. ................................. 400/320; 74/342; 403/329; 403/375
[58] Field of Search ............ 292/353; 74/342, 352, 74/530; 400/320, 323, 328, 719; 403/326–330, 355, 357, 375

[56] References Cited

U.S. PATENT DOCUMENTS

| | | | |
|---|---|---|---|
| 2,437,094 | 3/1948 | Hyland | 74/342 |
| 3,264,016 | 8/1966 | Reisch | 403/375 X |
| 3,429,199 | 2/1969 | Kenyon | 403/375 X |
| 3,986,594 | 10/1976 | Kondur | 400/328 X |

*Primary Examiner*—Paul T. Sewell
*Attorney, Agent, or Firm*—J. T. Cavender; Wilbert Hawk, Jr.; George J. Muckenthaler

[57] ABSTRACT

A drive member in a printer is radially oriented and linearly positioned in the fastening thereof on a shaft at one of a plurality of selected positions. The shaft has a flat portion which receives a hub of the drive member, the hub conforming in shape with the shaft and having a tongue portion thereof fitting along the flat portion of the shaft with the tongue portion being flexibly supported and having a lip engageable with grooves or slots in and across the flat portion of the shaft.

7 Claims, 3 Drawing Figures

LOCATING AND MAINTAINING A HUB MEMBER ON A SHAFT

BACKGROUND OF THE INVENTION

The use of a drum cam on a shaft for driving a printing carriage back and forth across a printer requires that the drive member for the drum cam be precisely secured or fastened on the shaft. Various ways and means for fastening drive or like members have included key ways and keys, set screws, roll pins, and mating surfaces such as splined or flatted shafts.

Additionally, it is also desirable to provide for selective positioning of the drive member on the shaft so as to enable the shaft with its associated devices to be used in more than one application. In this regard, the drive member is movable along the shaft and secured at one of a plurality of positions on the shaft.

Representative prior art includes U.S. Pat. No. 1,030,592, issued to J. A. Leland on June 25, 1912, which shows a telescopic extension rod with a longitudinal groove and recesses in the groove. A tube slides on the rod and has a clutch lever with projections and an adjustable sleeve.

U.S. Pat. No. 2,131,152, issued to B. C. Stickney on Sept. 27, 1938, shows a typewriter shaft having an impaling-pin wheel at each end and moved into and out of position by a control lever.

U.S. Pat. No. 2,360,196, issued to C. W. Brumhill on Oct. 10, 1944 discloses a platen carriage in a typewriter with releasable latching mechanism for holding a tear-off knife in the operative position and means for retaining the knife in an inoperative position.

U.S. Pat. No. 2,411,293, issued to W. A. Roehner on Nov. 19, 1946, shows a ticket roll on a hub and a resilient element bearing against one side of the roll for a stopping or braking effect thereof.

U.S. Pat. No. 2,963,138 issued to W. S. Motte et al on Dec. 6, 1960 shows an accounting machine with a shiftable platen and a plurality of pressure rollers.

U.S. Pat. No. 3,047,318 issued to R. H. Berkshire on July 31, 1962 shows a device for precision mounting of a gear on a shaft which utilizes a hole defined along the shaft, a radial bore in the hub, a tapered plug for press-fitting in the radial bore and a pin wedged for a press-fit with the plug and the pin cooperating to provide axial adjustment on the shaft by rotation of the tapered plug.

U.S. Pat. No. 3,245,633 issued to A. Madel on Apr. 12, 1966, shows a cash register with a paper tensioning member and drag means for maintaining and releasing the member.

U.S. Pat. No. 3,362,738 issued to G. C. Dygert et al on Jan. 9, 1968, shows a fitting to secure a support to a frame with the fitting having a base and legs with openings for a straight bar. A pin is biased by a spring through an opening in the bar and secures the support in a desired opening in the frame member.

U.S. Pat. No. 3,426,880 issued to E. O. Blodgett on Feb. 11, 1969, shows a matrix page printer with a guide rail and teeth engaged by a pawl nose section for adjusting along the guide rail.

U.S. Pat. No. 3,525,271 issued to M. H. Raines on Aug. 25, 1970, shows a gear with a spring pressed key in a beveled key way formed on a shaft to remove a gear when the shaft is rotating or when it is stationary.

U.S. Pat. No. 3,612,582 issued to A. Pitner of Oct. 12, 1971, shows mounting of a member on a shaft wherein two U-joint yokes are each provided with a hub, and a dowel pin or key is used both to secure the yoke on the shaft and to fix the two yokes in driving relation. A pin or key may also be used to press into the shaft to form the shaft with a seat for the pin.

U.S. Pat. No. 3,655,023 issued to A. Stanevich on Apr. 11, 1972, shows a platen assembly for a typewriter with selective disengagement of a first clutch through a second clutch and several means of platen rotation by use of the clutches in single manner or in engaged manner.

U.S. Pat. No. 3,753,483 issued to I. H. Lundquist et al. on Aug. 21, 1973, shows a typewriter dual feed apparatus with a single arm and linkage assembly for roller release feed in a first position and for retraction of the platen for computer feed in a second position.

U.S. Pat. No. 3,830,577 issued to John W. Rampe et al. on Aug. 20, 1974, shows a shaft and a hub with an aperture positioned to receive a pin and whereby the pin is forced into the shaft by crimping the sides of a clamp.

And, U.S. Pat. No. 3,915,281 issued to J. E. Blomquist et al. on Oct. 28, 1975, shows paper feed mechanism for a printer with a shaft with spaced peripheral grooves selectively engageable by a flexible in-turned flange on the end of a sleeve which is rotatably mounted on the shaft.

SUMMARY OF THE INVENTION

The present invention relates to means for fastening a member on a shaft and more particularly, to means for locating and maintaining the member at one of a plurality of positions along the shaft. A drum cam is secured at one end of the shaft, the cam being utilized to drive a print head carriage back and forth across a printer. A drive member in the form of a drive gear has a hub which fits the shaft in a manner wherein the drive member is fixed in a radial direction or orientation so as to prevent rotation of the drive member in relation to the shaft. Whenever the drive member is rotated, the shaft must also rotate with the drive member.

The shaft has a flat portion for a certain distance from one end thereof so as to have a D-shaped cross-section and the hub of the drive member is like-shaped to precisely fit the flat portion of the shaft. The shaft includes a plurality of slots or grooves across the flat portion for reception of the lip of a tongue portion of the hub. The tongue portion of the hub is a periphery-like part of the hub and extends along the flat portion of the shaft, but being separated at the sides of the tongue to permit flexibility thereof in relation to the hub and to the shaft. The lip extends towards the axis of the shaft and is of a shape to fit into one of the grooves or slots in the flat portion of the shaft. The extreme tip of the tongue beyond the lip is formed in a slanted or beveled manner to provide an access area for lifting the tongue in a direction radially from the shaft and for removing the tip of the tongue portion from the slot or groove. The hub and associated drive member may then be moved along the flat portion of the hub to a second location and maintained in that position.

In view of the above discussion, the principal object of the present invention is to provide a method for locating a hub member at one of a plurality of positions along a shaft.

Another object of the present invention is to provide a method for maintaining a hub member at one of a plurality of positions along a shaft.

An additional object of the present invention is to provide a D-shaped shaft and a like-shaped hub for precise fitting thereon to prevent rotation of one of the members.

A further object of the present invention is to provide a hub member with a flexible portion for engaging in one of a plurality of slots or grooves located along the flatted portion of the shaft.

Additional advantages and features of the present invention will become apparent and fully understood from a reading of the following description taken together with the annexed drawing.

DESCRIPTION OF THE PREFERRED EMBODIMENT

Figure 1:
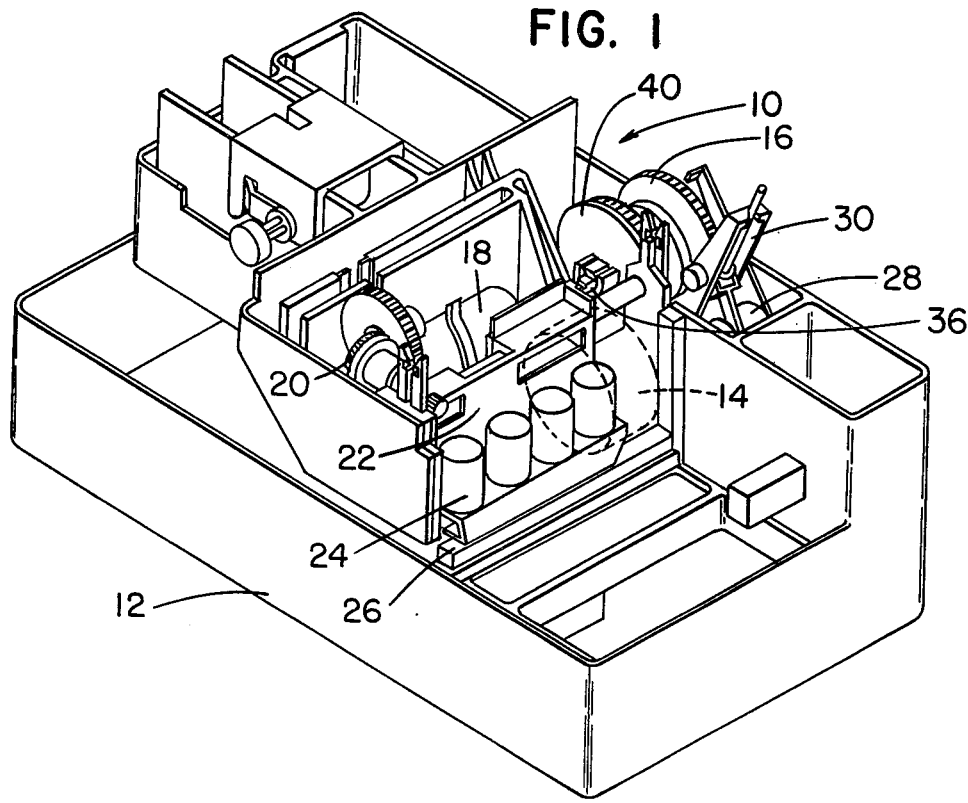
FIG. 1 is a left front perspective view of a printer incorporating the subject matter of the prsent invention.

Referring now to FIG. 1, there is shown a business machine in the form of a printer of the matrix type generally designated as 10, the top cover or portion thereof being removed to illustrate certain of the interior working parts which are contained within an enclosure 12. The enclosure 12 is of rectangular shape and provides protection for a compact high-speed wire matrix printer. A drive motor 14 is positioned to drive a plurality of gears or cluster of gears 16, a drum cam 18 and a bevel gear 20 which is used for driving a ribbon in continuous manner past the printing station. The drum cam 18 is continuously driven and provides side-to-side drive or movement for a print carriage 22 which carries a plurality of solenoids 24 for printing in a dot matrix manner on printing paper or like form paper which is caused to be driven or moved across a platen 26, such platen being in the shape of a flat bar disposed laterally across the printer. The printing solenoids 24 are caused to be moved as a group for a distance of approximately 0.6 to 0.7 inch during the printing operation which includes printing in each direction of movement of the printing carriage 22. At the end of each line of printing, the paper is caused to be moved by an incremental dot feed arm 28, wherein in the case of a seven dot height matrix character, the feed arm advances the paper a total of seven times to complete the line of character printing. A line feed arm 30 provides for advancing the printing paper at a line-to-line spacing, which advances the paper for the next line of characters to be printed.

Figure 2:
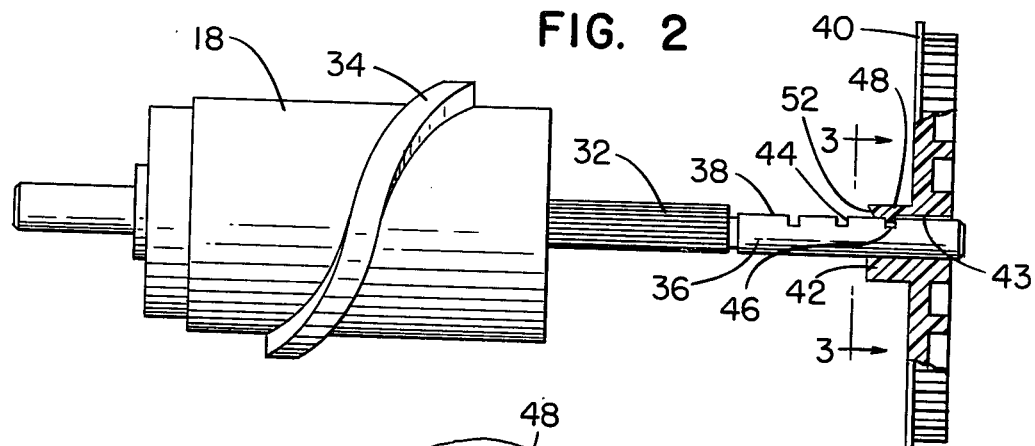
FIG. 2 is a front view of the hub member secured at one position on the shaft.
Figure 3:
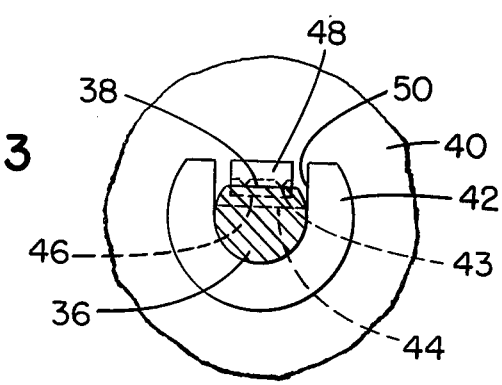
FIG. 3 is a sectional view taken on the plane 3—3 of FIG. 2.

In FIG. 2 is shown an enlarged view of the drum cam 18 secured to a drive shaft 32 which is splined for a portion of its length to provide a precise and secure position of the cam 18 on the shaft. A cam rail 34 on the periphery of the drum cam 18 cooperates with mating cam means on the print solenoid carriage 22 in a well-known manner to cause the carriage to be moved in an oscillating manner across the printer. The right hand portion 36 of the shaft 32 has a flat surface portion 38 and carries a plastic drive pulley 40 near the end of the shaft portion with the pulley having teeth on the periphery thereof for utilizing a timing belt (not shown) trained therearound and driven by the motor 14. The pulley 40 includes a hub 42 as an integral portion of the pulley and extending along the shaft, the hub being shaped in a manner to fit the shaft portion 36 with a flat surface mating with the flat surface 38 of the shaft. As illustrated in FIG. 3, the flat surface of the hub 42 includes a plurality of small triangular shaped ribs 43 extending along and running parallel with the flat surface portion. The ribs reduce the amount of play in the radial direction and are designed with a slight frictional or interference fit on the shaft 36 to remove all clearance between the parts. The shaft portion 36 assumes a D-shape with the hub 42 also being D-shaped as seen in FIG. 3.

The shaft portion 36 includes a plurality of transverse grooves or slots 44 formed at spaced intervals in the flat surface portion 38 for engagement by a lip 46 on the inside surface of the hub 42. More specifically, the lip 46 is a part of a flexible tongue portion 48 of the hub 42, as seen by the kerf 50 on either side of the tongue portion shown in FIG. 3. The tongue portion 48 also has an inclined or slanted frontal tip 52 (FIG. 2) for enabling ease of raising slightly the tongue portion when moving the hub from one slot to another slot along the shaft 36.

The slots 44 are spaced at predetermined locations along the reduced radius portion 38 of the shaft 36 for accommodating the placing of the drive pulley 40 for different drive arrangements. The tongue portion 48 is normally biased against the flat surface of the shaft and the lip 46 is caused to automatically engage with one of the slots 44 when the lip is aligned with the slot. Since the small triangular shaped ribs 43 extend longitudinally along the shaft portion 38, the ribs tend to be flattened when the hub 42 is slidably fit on the shaft.

It is thus seen that herein shown and described is an assembly of a shaft and a drive pulley wherein the pulley is located and retained in a desired position by use of a shaped shaft and a matching shaped hub which includes a flexible portion for enabling selective positions of the drive pulley along the shaft and also for positioning the pulley in angular rotation in relation to the orientation of the shaft. The assembly enables the accomplishment of the objects and advantages mentioned above, and while a preferred embodiment has been disclosed herein, certain variations thereof may occur to those skilled in the art. It is contemplated that all such variations and modifications not departing from the spirit and scope of the invention hereof are to be construed in accordance with the following claims.

What is claimed is:

1. In a business machine having a drive shaft, a driving element and a driven element on said shaft, means for radially orienting and selectively positioning said driving element along said shaft comprising a shaft portion having a reduced radius surface on an arc of said shaft to provide a shaped portion, a hub member integral with said driving element and extending along said shaft portion in like shaped form, a hub member portion separated from said hub member along the length of the hub member portion on either side thereof for a distance along said shaft portion and normally biased for engagement with said shaft portion, a plurality of transverse slots in the surface of said shaft portion, and a lip portion on said hub member portion for automatic engagement with a selected one of said slots when aligned therewith.

2. In the machine of claim 1 wherein said shaft portion comprises a flat surface portion along said shaft.

3. In the machine of claim 1 wherein said hub member portion comprises a flatted tongue portion fitting on said reduced radius surface.

4. In the machine of claim 1 wherein said plurality of slots are spaced in predetermined manner along said shaft portion and said lip portion of said hub member comprises a rectangular formation engageable in an aligned slot.

5. In the machine of claim 1 wherein said hub member portion includes a tip thereof slanted to enable ease of disengaging said lip portion from said one of said slots.

6. In the machine of claim 1 wherein said hub member portion includes a plurality of longitudinal ribs extending therealong for frictional contact with said reduced radius surface.

7. In the machine of claim 1 wherein said hub member portion comprises a rectangular tongue portion separated from said hub member on either side thereof for a distance from one end to said driving element.

* * * * *